United States Patent

[11] 3,611,308

[72] Inventor William T. Grinnell
Burlington, Mass.
[21] Appl. No. 833,121
[22] Filed June 13, 1969
[45] Patented Oct. 5, 1971
[73] Assignee Viatron Computer Systems Corporation
Bedford, Mass.

[54] PRINTER TRANSLATOR SYSTEM
9 Claims, 15 Drawing Figs.

[52] U.S. Cl. .......... 340/172.5, 197/19
[51] Int. Cl. .......... G06f 3/10
[50] Field of Search .......... 340/172.5; 197/19

[56] References Cited

UNITED STATES PATENTS

| | | | |
|---|---|---|---|
| 2,379,862 | 7/1945 | Bush | 197/84 |
| 2,860,325 | 11/1958 | Welsh et al. | 340/172.5 |
| 3,236,351 | 2/1966 | Fitch et al. | 197/1 |
| 3,260,340 | 7/1966 | Locklar et al. | 197/19 |
| 3,278,003 | 10/1966 | O'Brien et al. | 199/18 |

*Primary Examiner*—Gareth D. Shaw
*Assistant Examiner*—Mark Edward Nusbaum
*Attorney*—James J. Cannon

ABSTRACT: The invention is a data translation and printing system in which the printing device may be a conventional typewriter and where the input to the system comprises encoded data of the type which may be recorded on magnetic tape or other suitable storage means capable of recording a digital or on-off electrical signal. The input terminal of this system, for example, may be fed ASCII coded data being played back from a magnetic tape recording. The system includes a buffer memory which feeds the input signal at a controlled rate to a translating circuit for converting the input to solenoid control signals to selectively drive solenoid-actuated plungers which physically activate the typewriter keys. Means are included in the system for arranging the format of the printed data including means for operating the typewriter tabulating means, the carriage return means, and the back space and the line-indexing means by using appropriate code signals or counters. The system also includes a means by which the tabulator system may be preprogrammed to provide a preselected typing pattern independent of the particular data input.

INVENTOR.
WILLIAM T. GRINNELL
BY
ATTORNEY

INVENTOR
WILLIAM T. GRINNELL
BY James J. Cannon
ATTORNEY

INVENTOR.
WILLIAM T. GRINNELL

BY James J. Cannon
ATTORNEY

INVENTOR.
WILLIAM T. GRINNELL
BY James J. Cannon
ATTORNEY

INVENTOR.
WILLIAM T. GRINNELL
BY James J. Cannon.
ATTORNEY

INVENTOR
WILLIAM T. GRINNELL
BY James J. Cannon
ATTORNEY

INVENTOR.
WILLIAM T. GRINNELL
BY James J. Cannon
ATTORNEY

INVENTOR.
WILLIAM T. GRINNELL
BY James J. Cannon
ATTORNEY

INVENTOR.
WILLIAM T. GRINNELL

BY James J. Cannon

ATTORNEY

INVENTOR.
WILLIAM T. GRINNELL
BY James J. Cannon
ATTORNEY

INVENTOR.
WILLIAM T. GRINNELL
BY James J. Cameron
ATTORNEY

INVENTOR.
WILLIAM T. GRINNELL
BY James J. Cannon
ATTORNEY

INVENTOR
WILLIAM T. GRINNELL
BY James J. Cannon
ATTORNEY

PRINTER TRANSLATOR SYSTEM

BACKGROUND OF THE INVENTION

The present invention relates to an automatic typing system for use in conjunction with computers or other data storage systems. An automatic system is provided in which encoded data, such as ASCII encoded data, may be printed out on a conventional typewriter. The system, for example, is useful in a data-handling system of the general type where data is encoded on a magnetic tape or otherwise for storage and retrieval or for use with the conventional 80 position paper punch cards.

A variety of computer systems are now in use in which information is encoded on magnetic tape or other storage means at some point in the computer program and where discrete portions also may have been encoded on individual cards. Prior systems of this type have used a variety of means for obtaining a readout of the encoded data in typewritten or printed form. The system of the present invention represents an improvement on the prior systems due to its direct application to a conventional typewriter and to its use of a control system where the operating signals such as back space, tabulator, indexing, and other functions may be encoded in the original data or alternatively obtained by the use of a programming board or counters set up by the operator independently of any particular data record. A relatively simple and compact system is provided where the typewriter-actuating means may be easily mounted on conventional typewriters and where the typing itself is done by a solenoid controlled manipulation of the conventional typewriter keyboard.

SUMMARY OF THE INVENTION

The typewriting or printing system of the present invention operates to translate an encoded computer data stream from the code used within the computer system to a second code suitable for selectively operating a solenoid-manipulated typewriter keyboard system The input to the system, which may be an ASCII encoded data stream, is first stored temporarily in a memory circuit for controlled entry into a printing code translator such as a read only memory which addresses a solenoid-selecting matrix,. The output of this matrix is fed selectively to electrically actuated plungers which physically operate the typewriter keys.

Additionally, an automatic tabulating system is included which is operated independently of the incoming data stream by means of a preprogrammed plug board. By this means, data which would normally be written in a continuous line may be differently organized during the typing operation by a preset operation of the typewriter tab key. This punch board may be set, for example, by the insertion of removable plugs to operate the typewriter tab at a predetermined line position to tabulate the typewriter carriage. Where the system is being used to record a conventional 80-character punch card data format, the automatic tabulating preprogramming board may be set at one or more of the 80-character positions to tabulate the typewriter carriage at this point. An 80-character message may thus, for example, be typed in four 20-character segments or in some other arrangement. This automatic tabulating saves the use of characters in the encoded data with one character being saved for each tie that a particular tab signal is desired.

Additionally, the system provided for an automatic carriage return and line indexing at the end of a predetermined number of printed characters which in the case of the punch card format, for example, may provide an automatic carriage return when the 80th character is printed. This also saves a character in the encoded data.

The system is adaptable for use with conventional typewriter keyboards for operating the various keys including the control keys. In addition to the automatic tabulating and carriage return noted above, these functions may also be preformed by including a particular character in the coded data and additionally the indexing and back space keys may also be operated by suitably encoded characters.

The use of the solenoid-actuated plungers adapts the system for use with regular typewriter keyboards which makes the system useful with a variety of machines and makes the machines directly interchangeable. The system is therefore adaptable to specialized typewriters having interchangeable typing mediums where a ball or other element in the typewriter may be removed and replaced by a similar ball having differing characters as, for example, the characters used in the presently recognized optical scanning systems as used on printed cards, checks, and other business forms.

Accordingly, an object of the present invention is to provide an improved printing system for providing a typewritten or other printed record from encoded data.

Another object of the present invention is to provide an improved data-printing means where a maximum amount of data is obtained from a minimum number of encoded signals.

Another object of the present invention is to provide a printer system for providing a printed record of encoded data utilizing conventional typewriters for the printing means.

Another object of the present invention is to provide a typewriter-style printing system for printing out encoded data where the printing elements are readily substituted using commercially available replacements.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

Figure 11A:
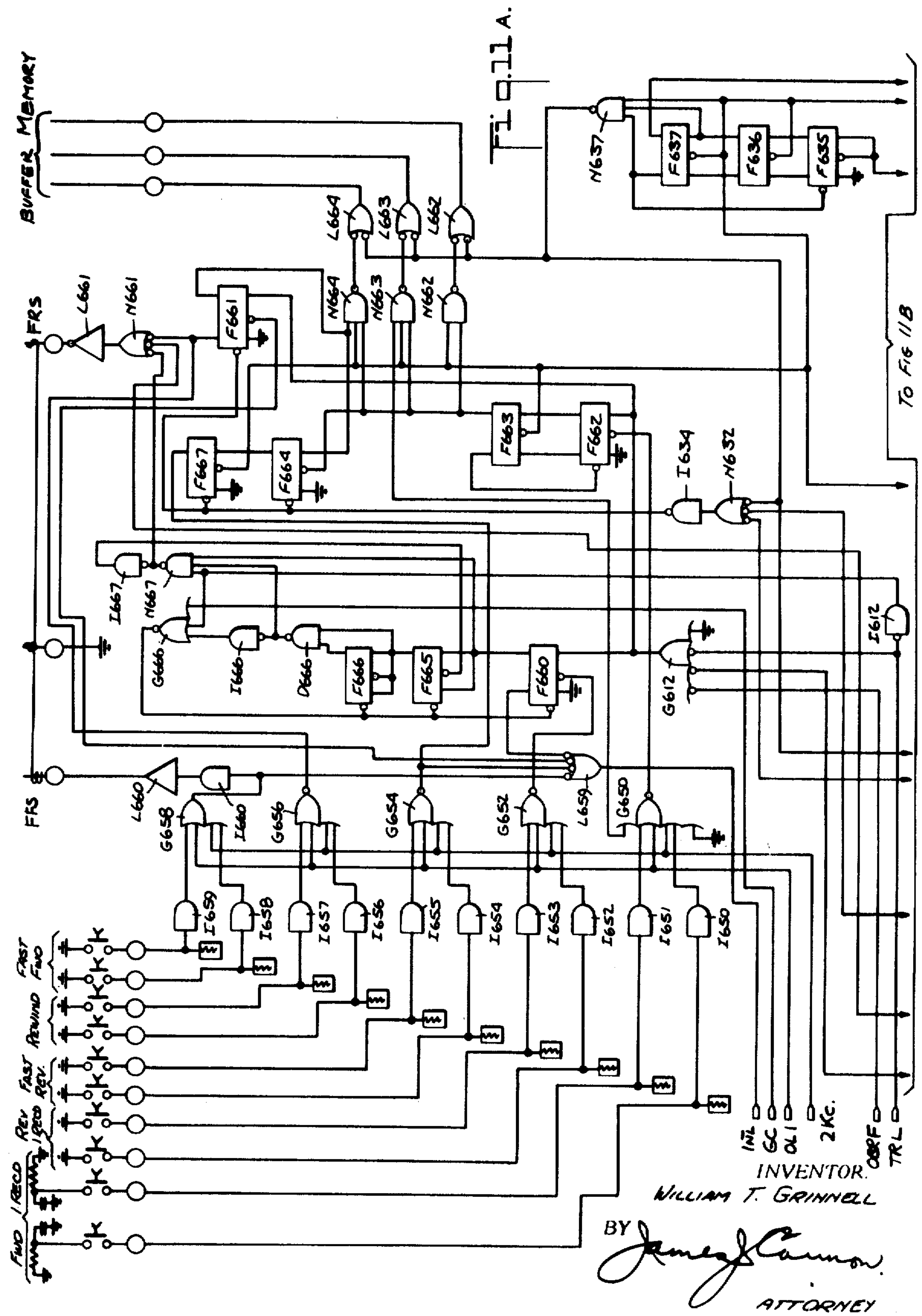
Figure 11B:
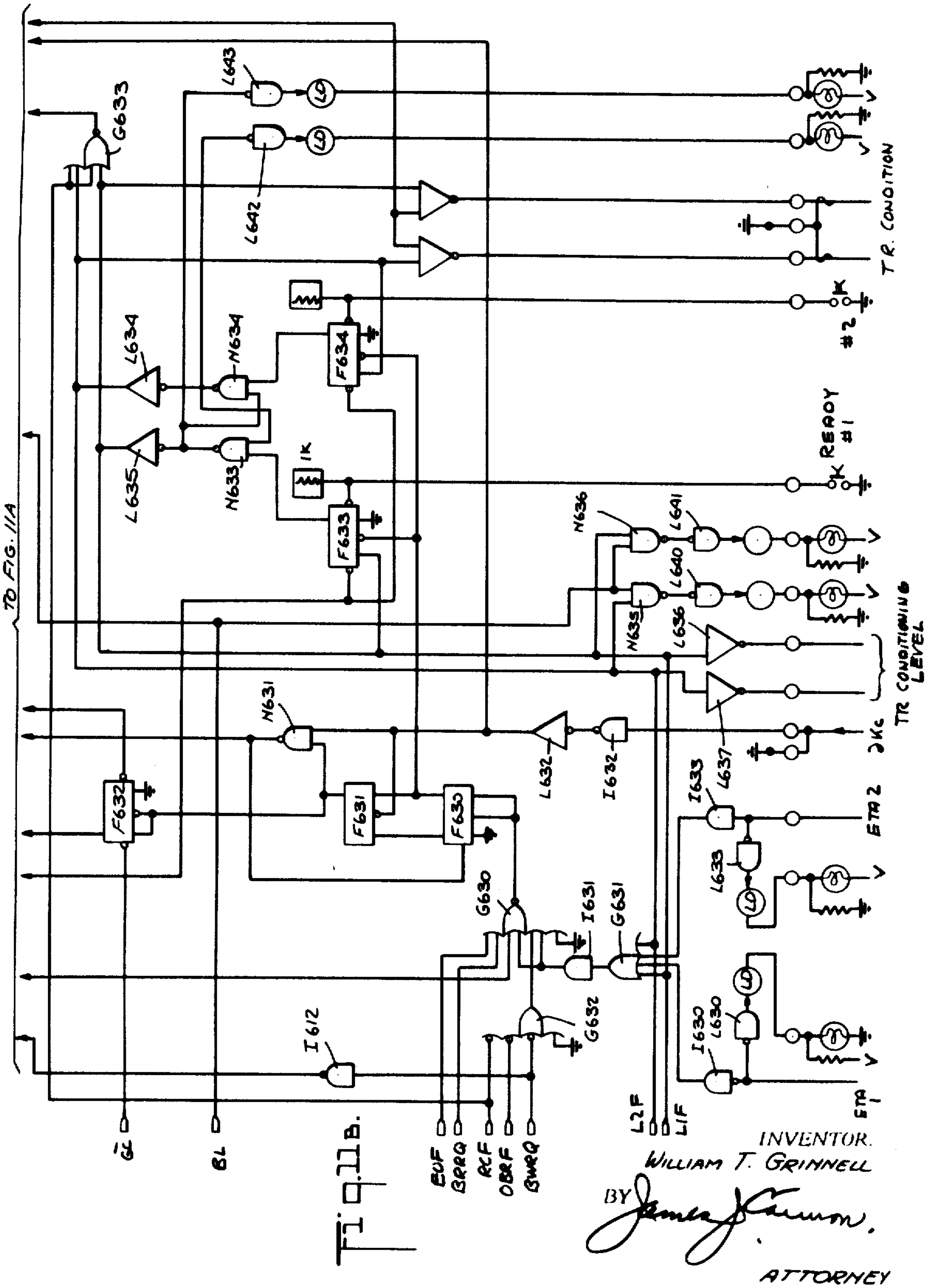
Figure 7A:
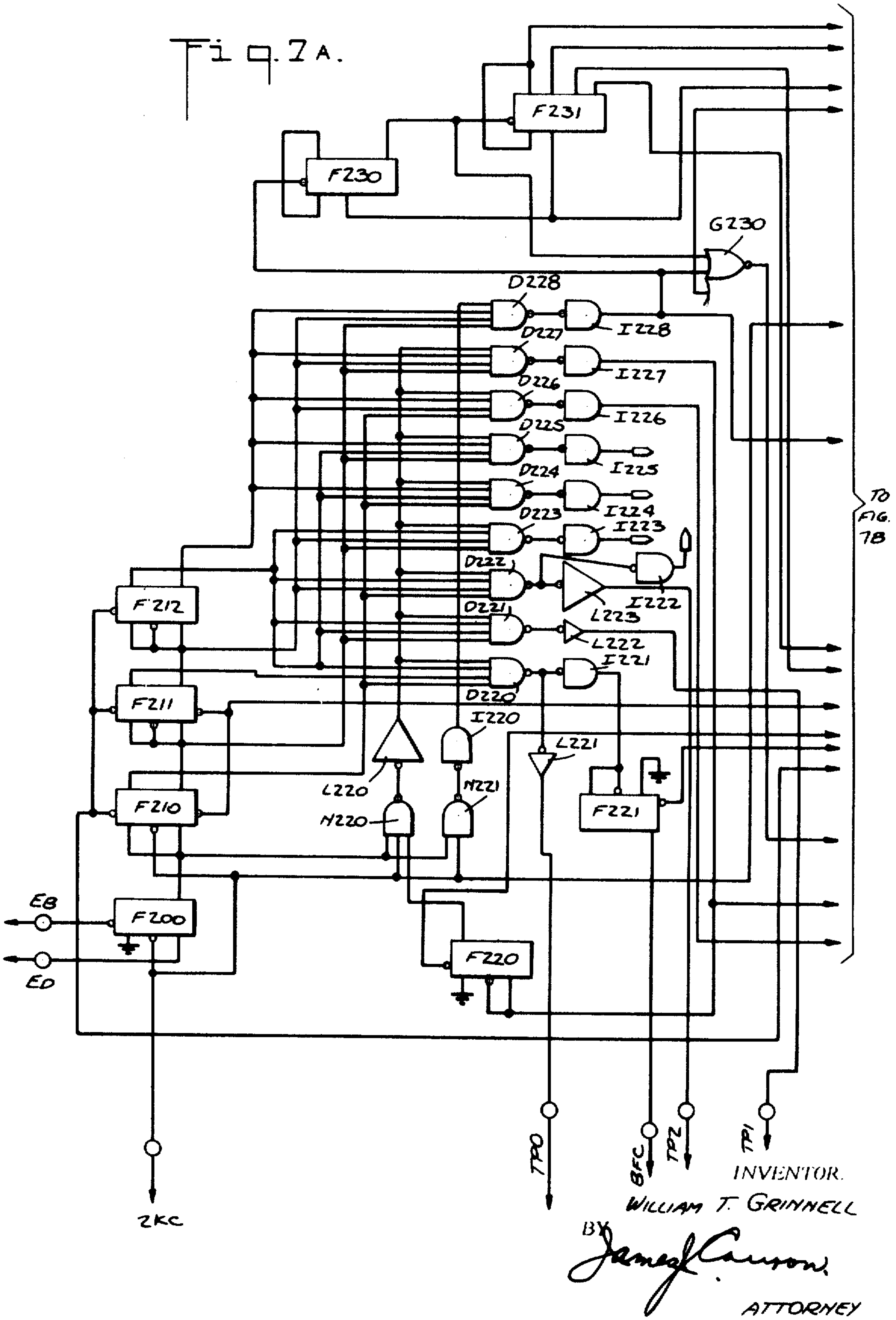

FIGS. 11A ,B and 12 are logic diagrams illustrating a preferred layout for the buffer memory control.

THE OVERALL PRINTER TRANSLATOR SYSTEM

Figure 1:
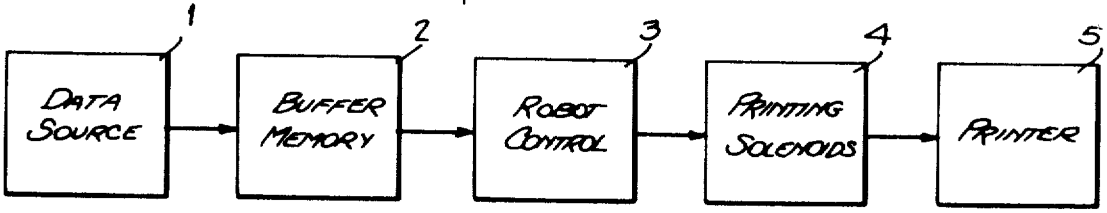
FIG. 1 is a block diagram illustrating a preferred embodiment of the printing system in accordance with the present invention.

FIG. 1 is a block diagram illustrating the principal portions of the translator system and reference will now be made to this figure for a general description of the system.

Block 1 illustrates a data storage device which is the source of the information to be written by the printers. A typical operation for which the system has been designed is a printing out of 80 characters on one or more lines of typewritten copy. It will be seen, however, that a greater or lesser number of characters can be handled.

The 80-character quantity is one useful example since this is the number of characters recorded on conventional computer punch cards. A preferred data source in data systems for which this translator will be used are magnetic tape recordings where successive groupings of 80-character recordings will be made on the tape with the 80-character groupings being spaced apart to permit the tape to be stopped and started by the operator or automatically during playback either by the control signals on the tape or under the control of a counting means which will count the decoded characters and control tape movement in accordance with this count. Other data encoding sources may be employed.

The data output from the data source 1 is preferably fed into a second circuit illustrated at 2 which is a buffer memory. This is a recording system which may be a circulating memory capable of storing a preset number of characters such as one or more of the preferred 80-character groups. These characters are stored in the buffer memory so that they may be thereafter retrieved and fed out of the buffer memory at a predetermined rate. This permits further transfer of the encoded data to the typewriter to be controlled at a lower speed compatible the typewriter actuating system and the typewriter capabilities itself. In a typical operation, 80 characters in ASCII data including eight bits with control information are fed at high speed from the tape recorder or other data source 1 into the buffer memory 2 and the stored characters are then fed on to the robot control one character at a time. Where a slow-speed data source is being handled, the buffer memory may be bypassed.

The robot control 3 received the character and decodes the character by using it to address the correct printing solenoid in the solenoid array 4. Additionally, the robot control 3 decodes the eight-bit character for controlling the solenoid operating time in accordance with the character to be printed and the spacing or typewriter dwell time required for a particular key being depressed.

Block 4 represents an electromechanical arrangement of solenoid actuated plungers. These plungers are physically aligned with the several typewriter keys and the plunger-actuating solenoids are connected to the robot control in an address arrangement where the robot and control selects and activates the particular plunger required.

Block 5 represents the printer or read out device which in the preferred embodiment may be read out device which in the preferred embodiment may be a regular typewriter having the usual keyboard so that the keys may be depressed by the various solenoids of the solenoid array 4. In a preferred embodiment, the typewriter may be of the type having an interchangeable printing medium so that the characters printed out or handled in the above described system may be any characters as included on the actual typewriter printing head or ball.

THE ROBOT CONTROL OPERATION

Figure 2:
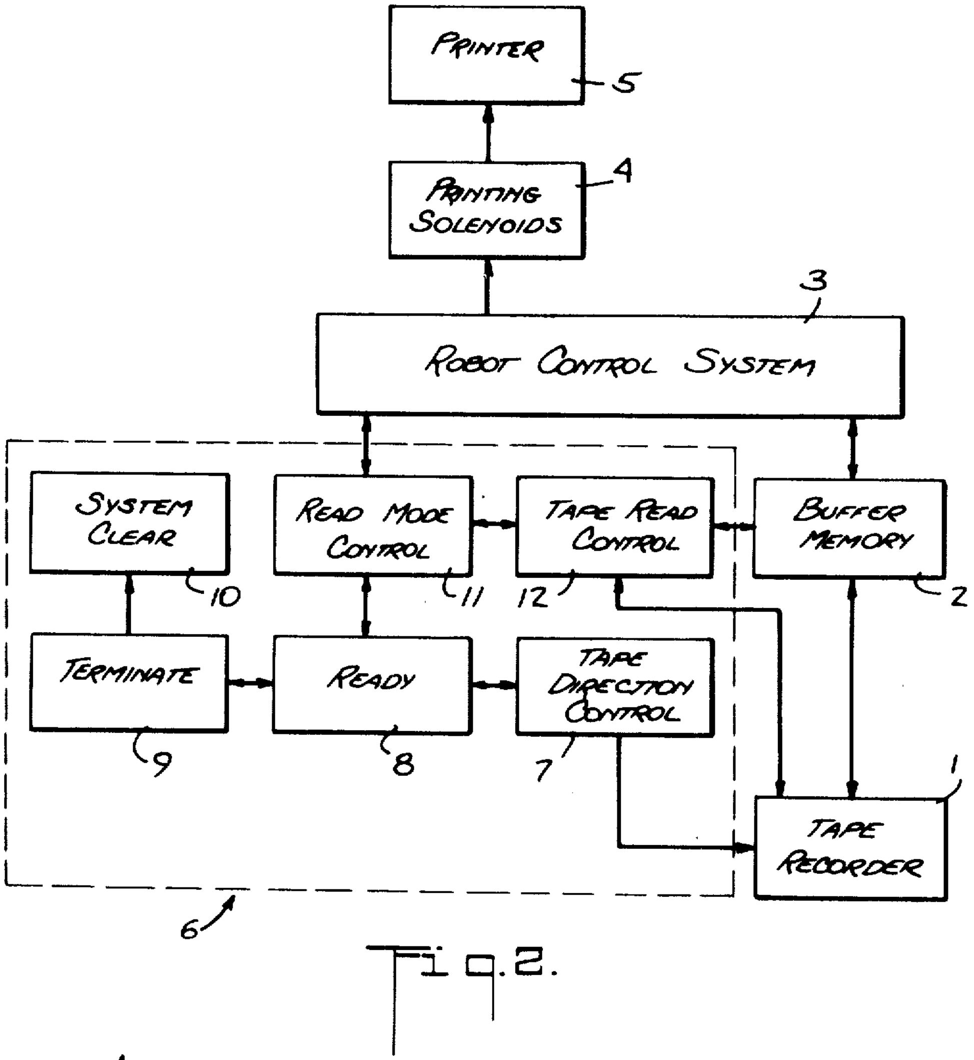
FIG. 2 is a block diagram illustrating further details of a preferred embodiment of the printing system of FIG. 1.

FIG. 2 is a block diagram illustrating the principal portions of the above-mentioned robot control system. These principal components are seen to be positioned intermediate to the solenoid array 4 and the buffer memory 2.

FIG. 2 illustrates a group of control means or functions within the box 6. These are the various controls necessary for controlling the entry of data into the buffer memory from the data source. In their simplest form these functions may represent switches performing the indicated function as, for example, using a tape data source they will include a tape direction control 7 for switching the direction of tape movement, a ready switch 8 which prepares the tape recorder tape position for play recorder after it has entered the predetermined number of characters such as an 80-character group into the buffer memory 2. A system clear means or function is illustrated by block 10 indicating means for presetting the system to its start mode prior to initial operation.

The tape read controls 11 and 12 are means for controlling the data flow i.e. for either a readout or a recording operation.

The above arrangements of controls is illustrative and it is clear that the source of data described herein as a tape recorder may be any other source of encoded data and it is also clear that this data may be fed directly into the robot control by any means whereby the eight bits of the characters are fed into the robot control system.

THE ROBOT CONTROL SYSTEM

Figure 3:
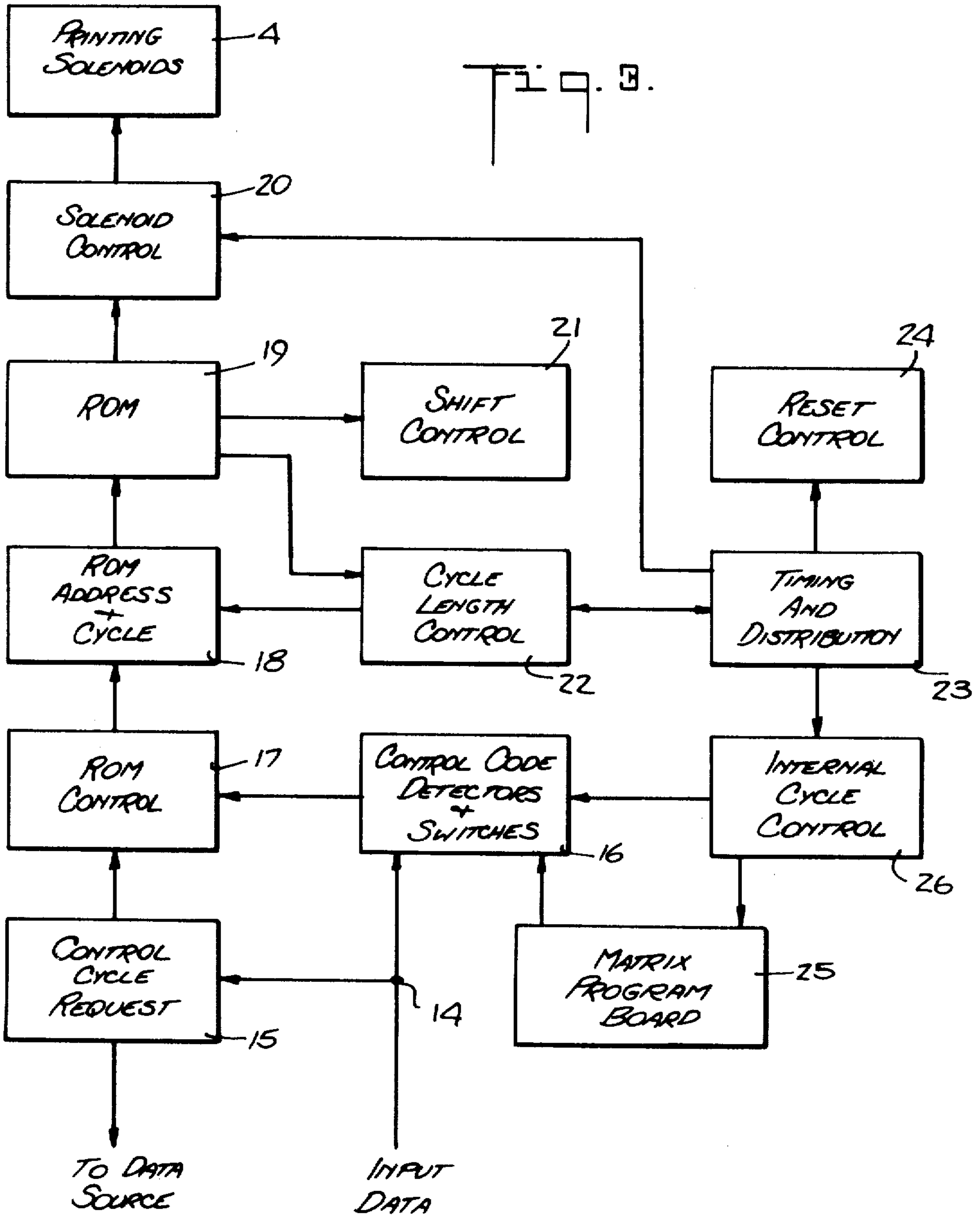
FIG. 3 is a block diagram illustrating a preferred embodiment of the robot control system for the printing system of FIGS. 1 and 2.
Figure 8A:
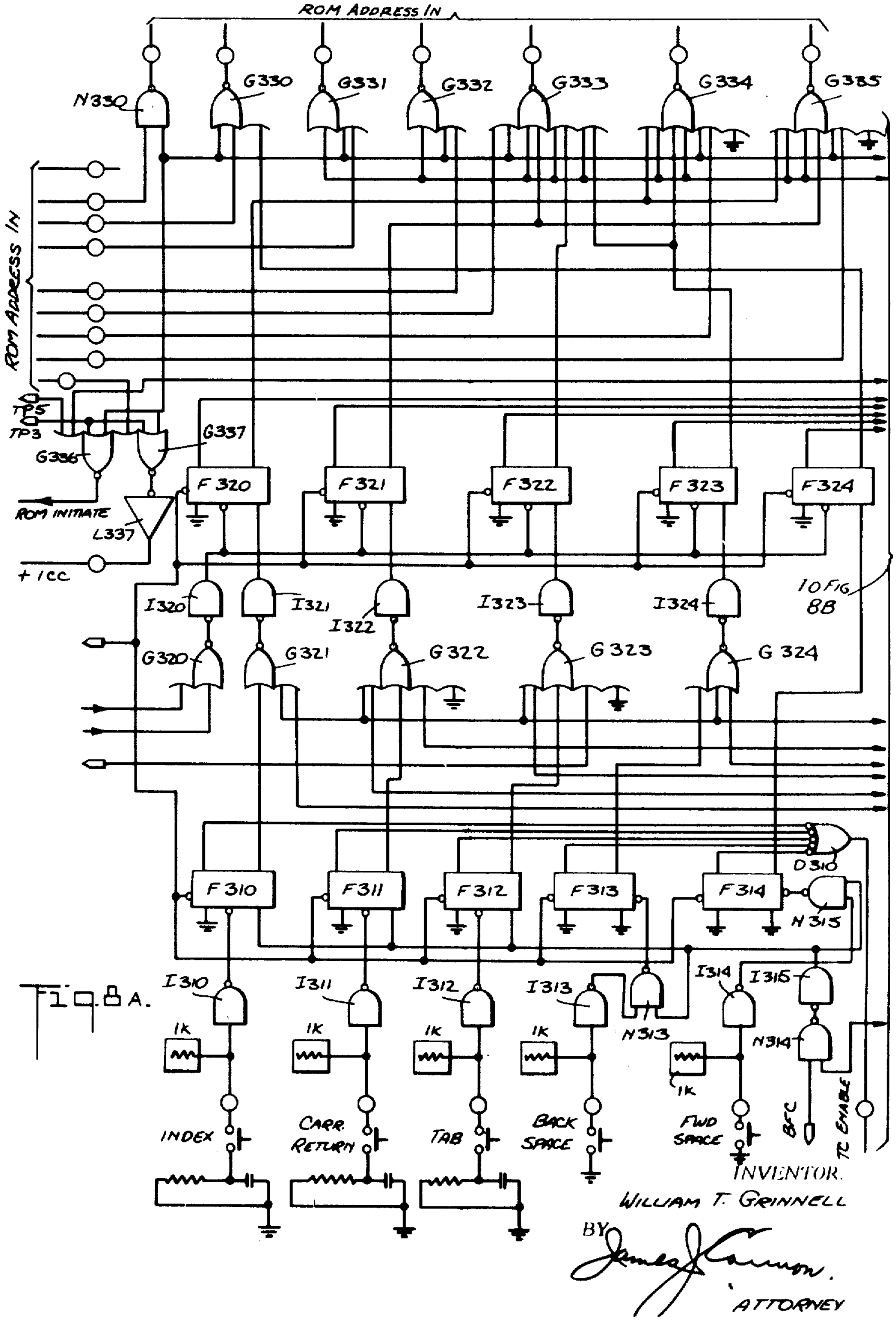
FIGS. 8A and 8B are logic diagrams illustrating a preferred layout for the system clear and ROM address logic and related logic.
Figure 7B:
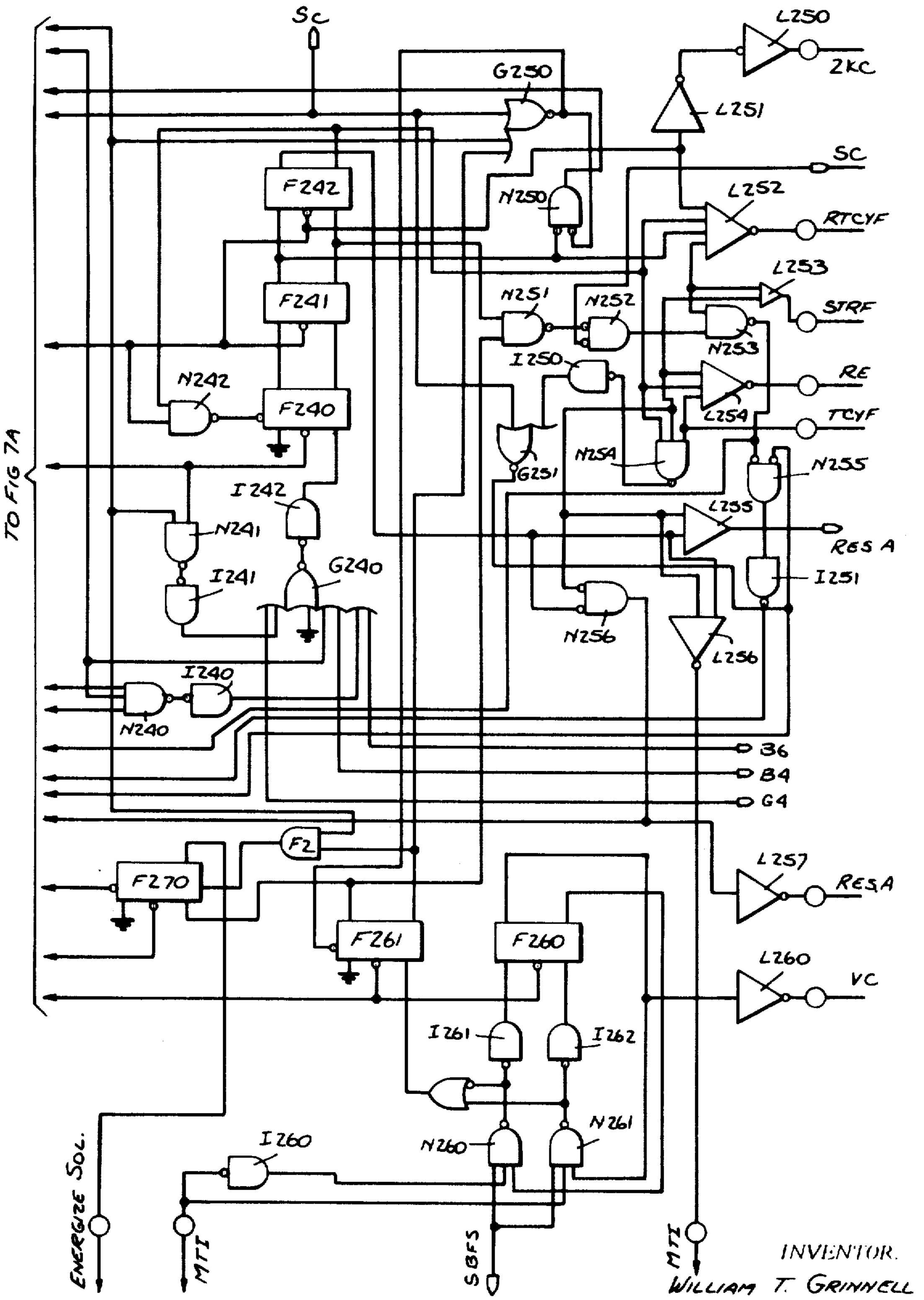
FIGS. 7A and 7B are logic diagrams illustrating the preferred layout for the reset pulse distribution and related logic.

FIG. 3 illustrates in a block diagram the principal circuits or elements of the robot control which is the means for receiving the characters of the data and for performing the code conversion to select the proper typewriter solenoid and also to determine the solenoid operated cycle. In other words, the solenoid dwell time on the key as related to the speed of operation of that particular key and the related operation of the typewriter mechanism where appropriate, such as the time required for a carriage return when the carriage return key has been depressed are controlled. The solenoids 4 for operating the keys as described above are shown on the output of the robot control. A data input is illustrated at 14 at which point the several bits of the character are received to initiate the above-described operation.

The system illustrated in FIG. 3 between the input 14 and the typewriter operating solenoid 4 translates or encodes the data input signal into the solenoid-actuating signal. The system is suited, for example, for obtaining a typewritten record of encoded input data. Such encoding may comprise the ASCII information character.

This data may be supplied at this point from any data source such as the above-described tape recorder and buffer memory combination or in its simplest form data might be supplied from a switch arrangement furnishing the desired combination of off-on pulse signal levels.

An input gate or control is illustrated at 15 which functions to control or request the supply of an input signal to the input 14. This control means 15 may operate on the basis of the completion of the printing of the preceding character or alternatively it might operate on a time control basis. In any event, this circuit is provided to pace or time the passage of characters through the robot control circuit. When an input is requested by the control 15, the encoded data or bits are fed into the control 15, the encoded data or bits are fed into the control code detector and switching circuit which samples the input data to provide control signals for the subsequent handling of the data, The output of circuit 16 passes through control indicators and in the case of alphabetical or numerical characters, the ROM (read only memory) control 17 passes the signals into the ROM address and cycle circuit 18. This circuit functions to address the ROM 19 whose output operates through the solenoid control 20 to activate a preselected solenoid on the printing solenoid 4 for the character being processed. In the event that the data addressed to the ROM 19 comprises a shift control signal, the ROM M output is fed directly to the typewriter shift control 21.

The ROM, simultaneously with its selection of the correct solenoid in the solenoid control 20, also has its output fed to the cycle length control circuit 22 and the timing fed to the cycle length control circuit 22 and the timing and distribution circuit 23 for determining dwell time to be used for the particular solenoid character being printed or for the typewriter function, as, for example, when a carriage return signal is involved which requires a longer interval between that signal and the following signal to permit correct positioning of the moving printing ball or carriage as the case may be.

The rest control 24 is activated by the timing control 23 to reset the typewriter for a subsequent character. A matrix control board is illustrated at 25 which will be more fully described below. This matrix is provided to give an automatic operation of the tab system for any preset character number among the 80-character display.

The related internal cycle control 26 is used with the timing and distribution 16 to feed the proper timing interval back to the control code detector circuit 16 and in addition for controlling the typewriter carriage at the completion of one character group.

ROBOT CONTROL SYSTEM OPERATION

A preferred robot system is illustrated in the logic diagrams in FIGS. 6 to 12.

The robot control system is placed in an operational mode by depressing the operate switch S100. The contact bounce of this switch is debounced by the delay Z110 after which a flip-flop or flop F100 is set. Each time the operate switch S100 is depressed the flop F100 will change state. The set level of flop F100 is gated with the busy flag and the 80th character detector thru a NOR gate N120. If the operate switch is on and the busy flag is cleared and the output buffer register level is at ground, all input to N120 will be high, so that its output will be low. Consequently the output of inverter I120 will be high. This will enable gate G120 and thru inverter I122 will send an enabling level to flop F200 which is the timing pulse counter enable flag. The input of the flop F200 being high will allow the next 2KC clock pulse to set flop F200. This in turn enables the divide-by-eight counter flops F210, F211, and F212 and in addition, partially enables the pulse distribution network thru AND gate N220 and also partially enables the carry pulse network thru gate N221.

Once the divide-by-eight counter has been enabled it will be clocked at a 2KC rate and thru the pulse distribution network timing pulses O thru 7 will be outputted. Timing pulse 7 will reset flop F220 thereby disabling the timing pulse distribution network, However, the carry timing pulse out of the divide-by-eight counter will not be inhibited and each carry pulse will be passed thru driver D228 and inverter I228 and sent to the two divide-by-sixteen counters for further distribution.

Whenever the timing counter is enabled, the first timing pulse TP O will always set the busy flag. In the normal mode or operation will all control switches in the print position the first timing pulse TP O will set flops F110 and F 220 and also set the matrix compare flag flop F140. Also, thru the loop action of gate N100 and inverter I111, the setting of flop F110 and feeding back thru gate N100 to reset this chain (which in effect generates a pulse at the output of inverter I111 which is fed into gate G337 and thru amplified L337 adds one to the matrix counter) thereby indicating to the decode logic that the current character is character number 1.

Assuming that there is no diode pin in the matrix board, there will be no character compare signal. Consequently timing pulse 1 will set the translator ready for data flag flop F150 which in turn indicates to the buffer memory that the translator is ready for data.

If the buffer memory is not ready to output data, the ODB will be at V high and will thru gate G122 reset the timing pulse counter enable flap flop F200.

When the buffer memory is ready to output data, the ODLB level will be at ground; therefore thru inverter I123 and gate G120 and inverter I122 the timing pulse counter enable flag flop F200 will be reset. In the current mode of operation no action is taken on TP 2.

TP 3 is gated with the shift bypass level from amplifier L340 and is used to add one to the matrix character counter and also to strobe data into the read only memory. Thus TP 3 is gated thru gate G337 and amplifier L337 for the addition and it is gated thru gate G336 to start the ROM initiate cycle. At this point the ROM will input the address as read from gates N330, G330 thru G335. As required by the ROM specification, the address at this point will be the complement of the true address.

When the output data is on the ROM it is sampled to see if it contains a control bit in position 2. A control bit will be present whenever the typewriter index tab carriage return or backspace code has been placed into the ROM Assuming that not control bit is present, bits 6 and 13 are sampled to see if a space code is on the output bus. One reason for sampling control bits and space codes is that these codes do not require the typewriter to shift carriage position. Consequently, if either of the codes is present, a shift-bypass-level will be set. For a normal operation the shift bypass level is not set.

Assuming that the output of the ROM contains a normal data character that requires an upper or lower case position, bit 1 is sampled to see if it contains a 1 or a 0. 1 indicates upper case and 0 indicates lower case.

Figure 5:
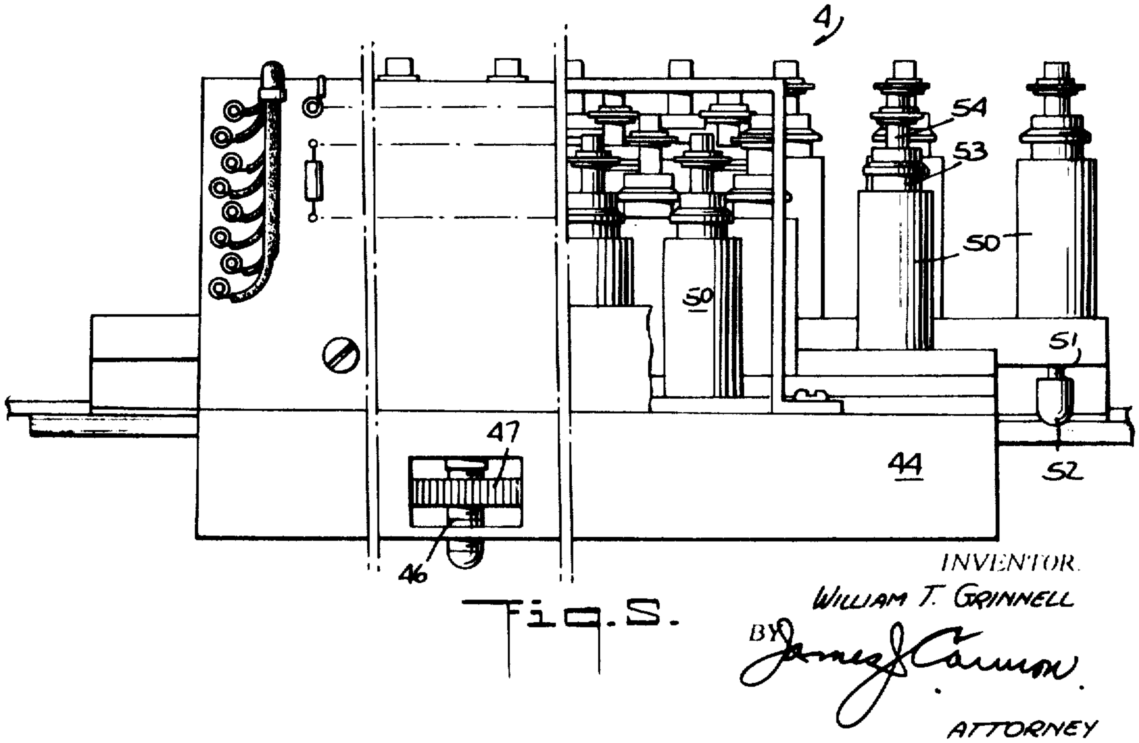
FIG. 5 is a front elevational view partially cut away of the solenoid printer of FIG. 4.
Figure 6:
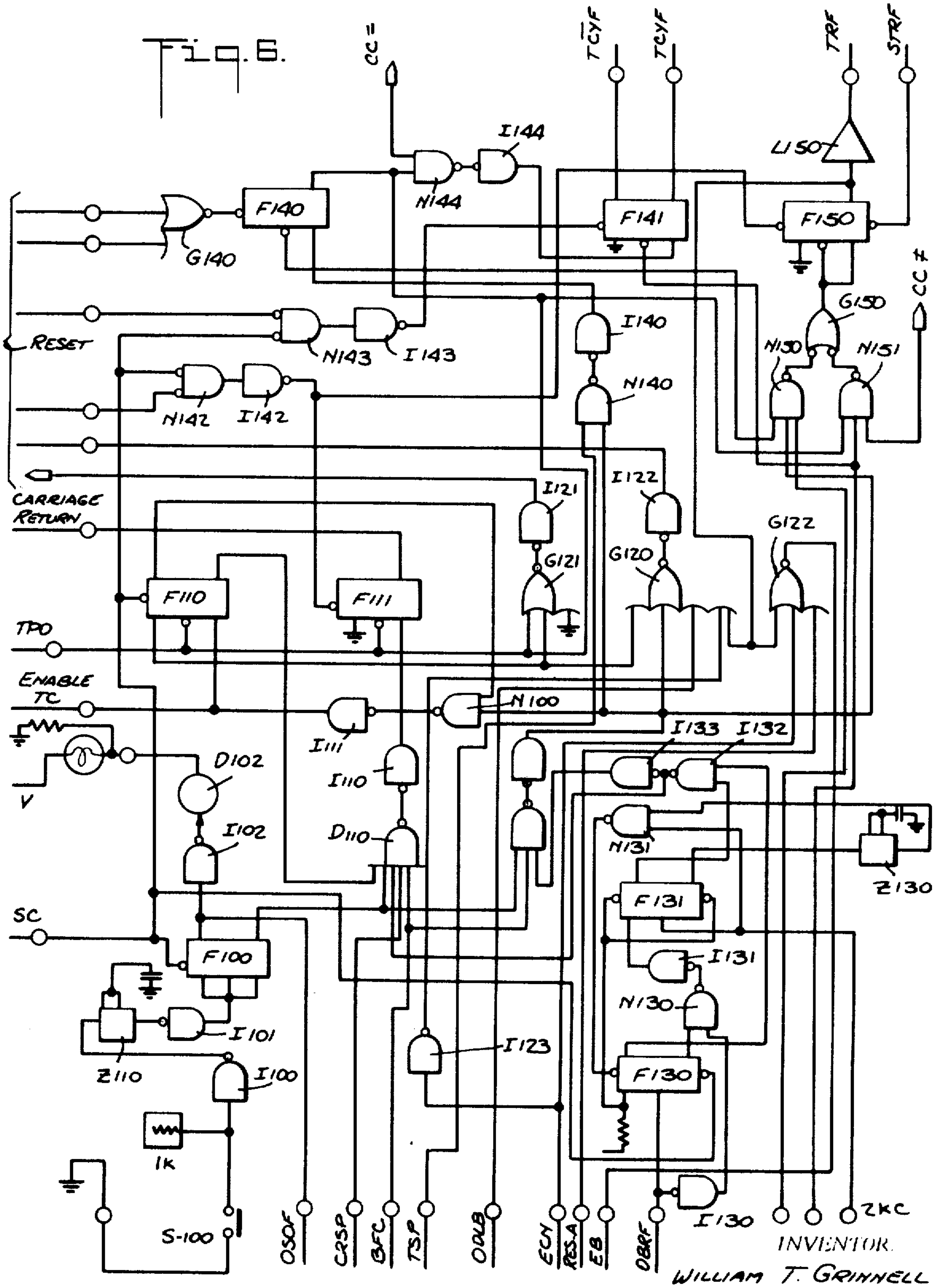
FIG. 6 is a logic diagram illustrating a preferred layout for the 80th character detector and carriage return and related functions.

In the shift control area of FIG. 5, the bit 1 sampling is done by inverter I260 and if the shift bypass level is at ground, either gate N260 or N261 will be partially enabled. The output of the shift flag flop F260 is sampled to see whether the carriage is presently in upper or lower case. If the carriage is in the proper case, no action occurs. However, if it is in the wrong position, timing pulse 6 is geared to the appropriate side of flop F260 by the proper enabling of gate N260 or N261. In addition, the shift delay flag flop F261 is set, indicating that enough time must elapse to allow the typing keys or balls to settle into position prior to energizing the data solenoid.

Prior to this point, all actions have occurred on timing pulses 0 thru 6. The next timing pulse, pulse number 7, disables the timing pulse distribution flop F220. Because the shift delay flag flop F261 is set, no further action occurs until timing pulse 9 appears at the output of flop F231. This pulse is gated thru gate G250 to reset flop F261, the shift delay flag. In addition, gate N250, flops F230, and F231 are set.

Flop F230, having been reset, begins to count again from 0 and when an output appears, begins to count again from 0 and when an output appears, it partially enables gate G230 which will pass the next carry pulse from the divide-by-eight counter to reset the solenoid on flag flop F270. The solenoids are turned on for approximately 30 to 35 milliseconds.

Various control codes require different cycle times. The normal cycle times is around 64 milliseconds and is applicable to all actions except the index code which requires 2 cycle times, approximately 128 milliseconds and to the typewriter carriage return and tab codes both of which require approximately 900 milliseconds.

The cycle length is determined by sampling the ROM data output bits at gates G350 or N350 and flagging 3 delay cycles, inverter I332 indicates the minimum delay and I351 indicates the intermediate delay, while inverter I350 indicates the longest delay. The outputs are gated thru gate G240 and are used to partially enable various timing pulses corresponding to the requested delays. The timing pulses are derived from flops F230 and/or F231 and are gated with the carry pulse from inverter I228. When the proper enabling signals are present on the inputs to gate G240 flop F240 is enabled. The timing pulse 7 carry is used to clock and set flop F240 thereby starting a reset cycle thru flops F241 and F242 and back thru gate N242 to reset the chain.

The pulses that are generated by the setting and resetting of flops F241 and F242 are passed thru the reset pulse distribution network and are distributed throughout the system. They are used to reset the output buffer of the ROM thru amplifier L255, to reset all timing counters and, in the event the tab cycle flag is in the clear position, to reset the EOR flag flop F111, the busy flag flop F221 and the translator ready for data flag flop F150 which places a high condition at the output of amplifier L150 (the signal that the translator is no longer ready for data).

AUTOMATIC TABULATE DETECTION

If, after the input cycle has begun, the character counter compares with a diode pin in the diode matrix program board, a compare signal will appear at the output of gate G434 which will partially enable gate N144. The other input to gate N144 will have previously been enabled by the setting of the matrix compare flag flop F 140 with TPO. Inverter I144 will enable the input to flop F141 which in turn will be set by TP 1 to request a tab cycle. TP 2 will set the tab control cycle storage flop F322 which in turn thru driver D340 and amplifier L340 will flag the shift bypass level and disable the normal ROM data input address and enable the address for the tab control code. After this is completed, no action will take place on timing pulses 3 and 4. Timing pulse 5 will be added with the shift bypass level to strobe the tab code into the ROM address register. Timing pulse 6 will cause no action because the shift bypass level has been set to a 1. Timing pulse 7 will, as before, disable the timing pulse distribution flag flop F220 and in addition set the solenoid on flag flop F270 which will be reset by timing pulse 8.

The cycle and its detectors will indicate the longest cycle. Consequently, the output of inverter I240 will be used to enable the reset counter logic and start the reset routine.

Since the tab cycle flap flop F141 was previously set the reset routine will end the cycle of operation. During reset, the tab cycle flag will be reset to 0 and the translator ready flag level will go low indicating that the translator is now ready for data and in addition the divide by 8 counter will be preset to output timing pulse 3.

Since the translator-ready-for-data level from amplifier L150 is placed at ground the control logic now waits for the output data level input to go to ground and as before, if this level is high, the timing pulse counter will be disabled at flop F200 or if the level is low, the timing pulse counter will be allowed to continue to run. Since the counter was present TP 3 will be the next pulse to be distributed. This pulse will now be added with the shift bypass level which is at 0 and will add 1 to the character counter. In addition, it will strobe data into the input address register of the ROM. From this point on, the same sequence of events that were previously described occur.

AUTOMATIC CARRIAGE RETURN

Whenever the carriage return switch is in the print position it is desirable to have an automatic carriage return at the end of every record. This eliminates the need of inserting control codes in the data stream.

In order to carriage-return at the end of every record, the system must detect an end-of-record signal. This end-of-record is done in the 80th character detector logic which consists of flops F130 and F131 and their associate circuitry. Whenever the OBRF level from the buffer makes a transition from ground to plus 5 volts indicating that the buffer has sent the 80th character flop F130 will be set and partially enables gate N130. Since the OBRF level has gone to high the output of inverter is at I130 ground. Therefore, the second input to gate N130 is disabled. Consequently, no further action will take place until the buffer is refilled and OBRF returns to ground.

At this time gate N130 will be fully enabled; therefore, an input to flop F131 will be enabled. The clock input to this input receives 2KC timing pulses and will be set with the leading edge of the next 2KC pulse. The setting of flop F130 will be sampled by delay Z130 and delayed for a time long enough to allow the 80th character carriage return flag to be set. After an appropriate delay the output of delay Z130 goes high, thereby partially enabling gate N131. The next clock pulse into gate N131 will reset flop F130 which in turn will cause an input to F131 to fall to ground, thereby enabling the next two KC transition to reset flop F131.

When the output of output of inverter I132 is high and the carriage return switch is in the print position and the other conditions necessary for the carriage return routine to operate are present, the output of inverter I110 will be high and will enable the timing pulse counter to gate G120 and inverter I122. The first timing pulse to arrive, TPO, will reset flop F110 and set flop F111 to flag the automatic carriage return code. After this TP 2 will set the carriage return storage flag flop F321.

TP 5 and the shift bypass level being high, the carriage return code will be strobed into the ROM. From this point on, a normal cycle of operation takes place.

THE TAPE RECORDER CONTROL

The following describes the control interface 5 (FIG. 2) between the tape recorder 1 and buffer memory 2, and the output of buffer memory 2 to peripheral devices, and its associated controls.

Figure 10:
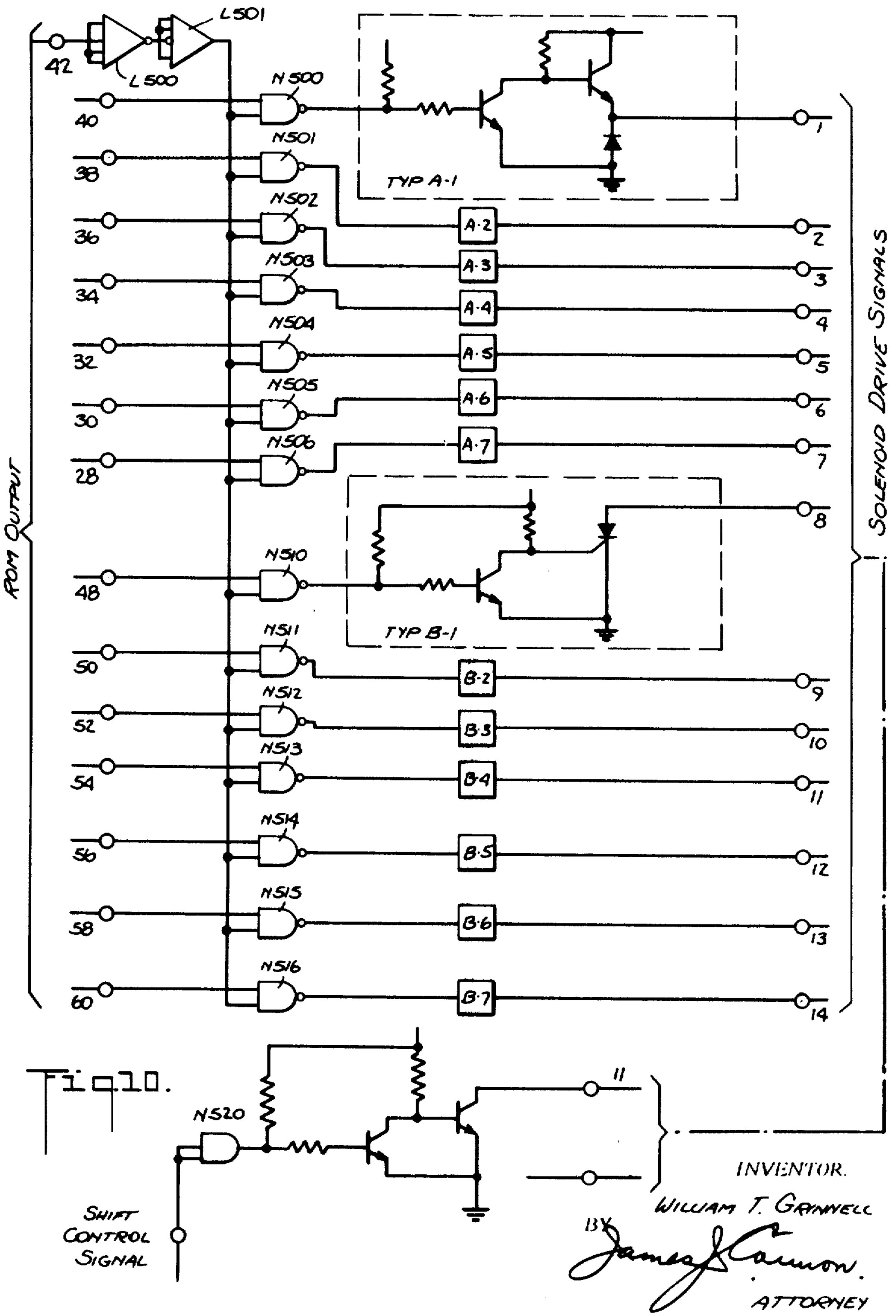
FIG. 10 is a logic diagram illustrating ta preferred embodiment of the solenoid control enable circuit.
Figure 9:
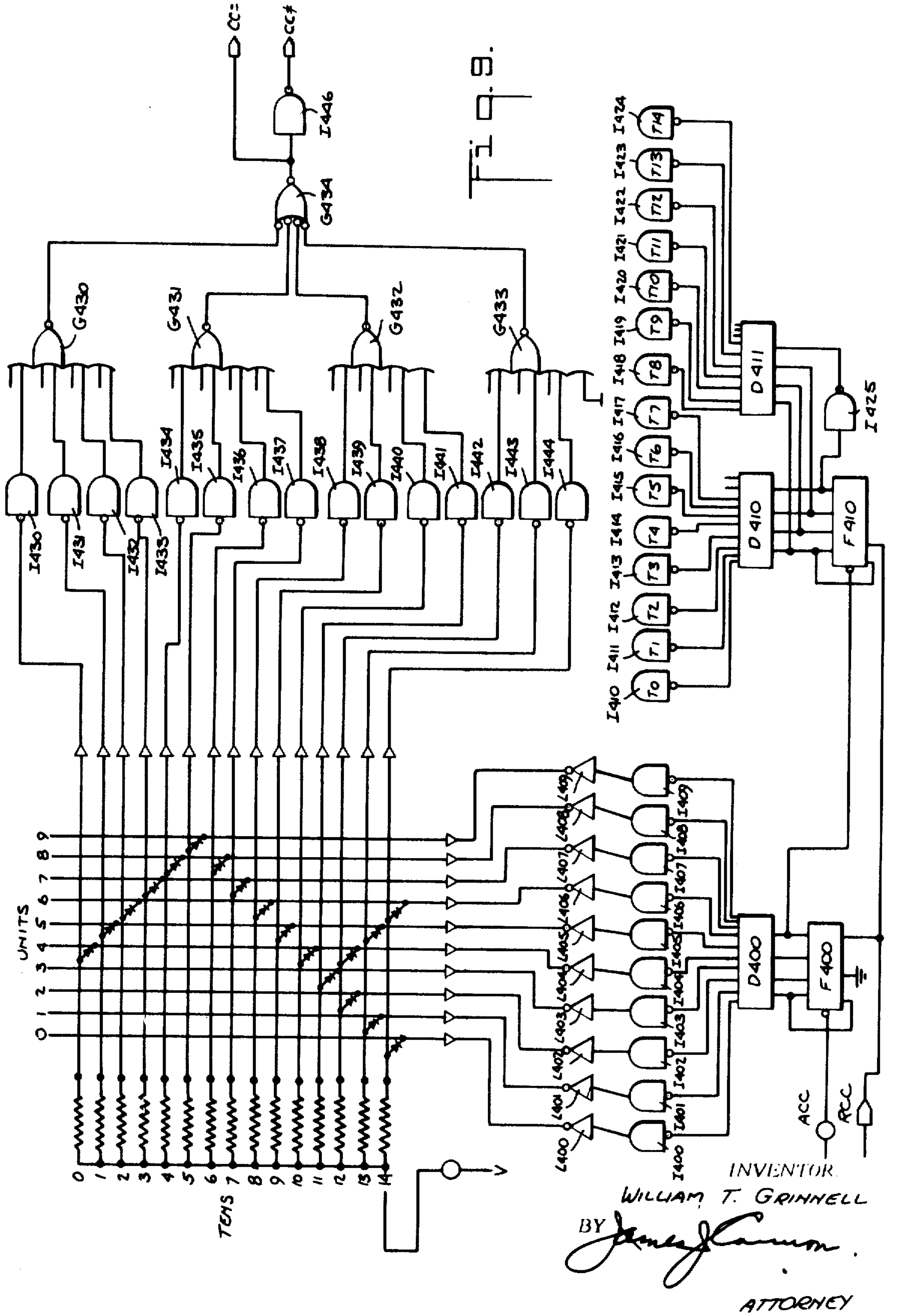
FIG. 9 is a logic diagram illustrating the preferred layout for the tabular select matrix logic.
Figure 8B:
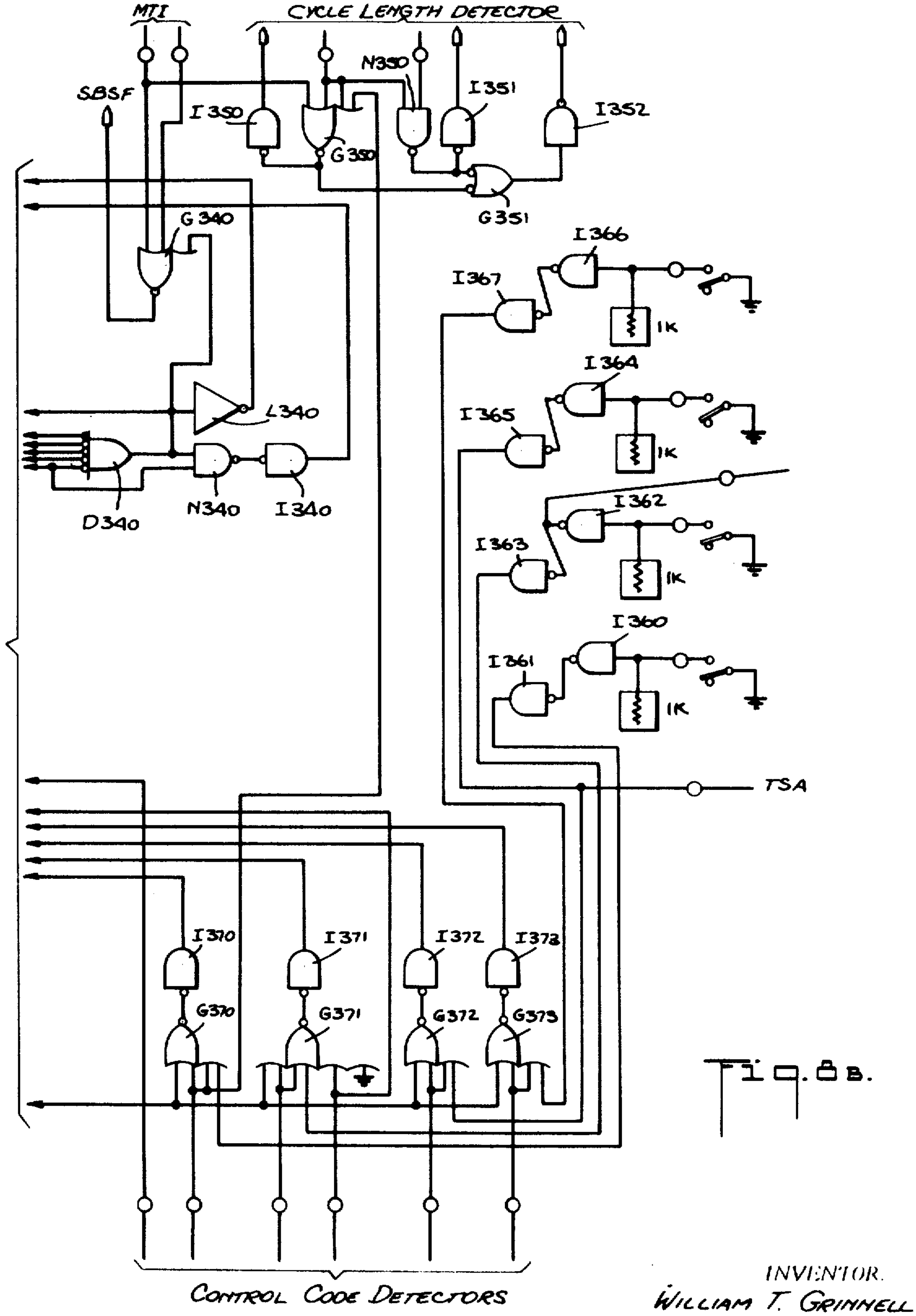
Figure 12:
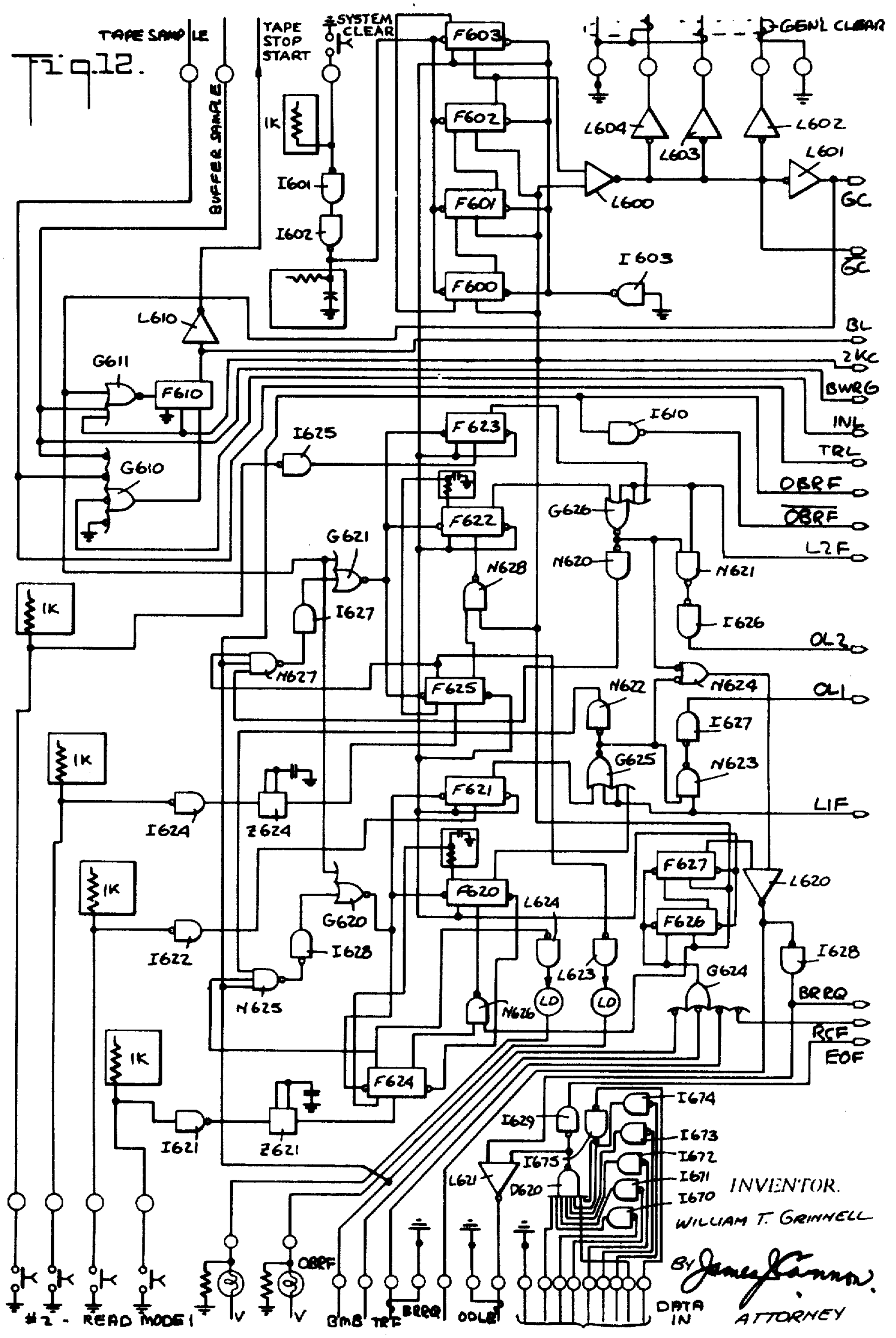

The logical description will be made with reference to FIGS. 9 and 10. The control operations may be divided into six functional operations as follows:

System Clear

A system clear logic operates in two modes: an automatic color and a pushbutton clear. Each time the power is turned on a series of three general clear pulses are transmitted from this system, and each time a system clear push button S620 is pressed, a train of three pulses is generated. The purpose of the system clear is to initialize and preset all control logic, both in the universal translator 3, buffer memory 2, peripheral device 5 and tape recorder 1 to a predetermined state.

Tape Direction Control Logic

This signals the tape recorder with either a forward or reverse command and/or an alarm clear pulse for the purpose of directing the tape motion in either a forward or reverse direction.

Ready Logic

In this portion decisions are made to place the desired recorder in a two recorder system on line and bring the tape up to its low point.

Read Mode Control

The machine may be placed in one of two read modes (and automatic mode that will enable the continuous reading of records or a one record mode that will allow only 80 characters to pass through before placing the peripheral device off line). The mode selecting logic in conjunction with the ready logic allows continuous cycling of two recorders.

Tape Read Control Logic

This senses the initial conditions of the tape recorder 1, buffer memories 2 and translators 3, and provides the necessary tape read control command.

Terminate Logic

In normal operation it is desirable to have the machine terminate its cycle at the receipt of the 80th character. To do this, the read mode control area is sensed and if the one record mode of operation is in process, or if the auto mode has been turned off by the auto mode switch, the read mode logic will signal the terminate logic at the receipt of the 80th character. The terminate logic will in turn cycle the machine off or, if a second tape is in place and was made ready, it will switch tape controls between the two recorders. In addition to the normal termination, it is desirable to stop operation in the event that there is no more data on the tape. This is done by encoding a special end of file code after all date has been entered on the tape at the processor end, and then detecting for this end of file code and terminating the cycle when it is detected.

A third method of termination is the detection of an end of tape alarm signal from the tape recorder.

System Clear Logic

The system clear logic is initialized either by depression of the system clear pushbutton S620 or the power turn on the system. Whenever switch S620 is pressed the reset sides of flop F600 thru F603 are pulled to ground resetting the four flops. When the pushbutton is released, the reset side is held to ground for the duration of an RC time constant D4. As soon as the resets are pulled high a 2KC clock is counted thru the chain of the four flops F600 thru F603. When flop F602 goes high it is gated thru amplifier L600 with the 2KC clock. The output of amplifier L600 is a general clear pulse which from this point on is distributed throughout the system. When flop F602 goes high F603 is also set high. The false side of flop F603 is fed back into the input of flop F600 and when clocked causes flop F600 to go low. This is passed thru the chain and eventually flop F602 is reset. However, during the period from the time flop F602 is set until it is reset, 3 clock pulses are allowed to pass thru amplifier L600. The inverter I603 is used only to bias the unused inputs of the type D flops.

Tape Direction Control Logic

There are five functions associated with this area and each function is implemented by one of two switches which in turn control either one of two recorders. In order for the tape direction control logic to work, the machine must not be in the read mode of operation and the associated tape recorder must be in the ready mode as indicated by the ready logic. Depression of fast forward switch S610 will cause inverter I658 to go high. This is ended with the online level for the recorder and pulls gate G658 to ground, which in turn pulls the output amplifier L660 to ground. The FFS level is a fast forward search command to the tape recorder and whenever it is at ground the tape recorder will go in the forward direction at its maximum rate of speed. 91 MAXIMUM RATE OF SPEED. Since gate G658 is at ground the output of amplifier L659 will cause gate G650 to go high. The input to flop F662 has been previously conditioned to a high state thru gate G612. Therefore, when the clock input of flop F662 goes high this flop is set. The output of flop F662 will enable flop F663 so that the next 2KC clock pulses will toggle flop F663 and will pass thru gates N662 and N663 and appear on the output connector as an output buffer register clear pulse.

In the fact forward search mode of operation, two objectives must be achieved. Both buffers in the buffer memory must be empty and the tape recorder must receive a fast forward search command. The two buffers are emptied by receipt of an input buffer register clear and an output buffer register clear pulse. The FFS is held to ground as long as the fast forward switch is depressed. When the switch is releases the line will return high.

Fast Reverse Search

In a fast reverse search mode of operation, both input and output buffers must be cleared and a fast reverse search command must be transmitted to the tape recorder. Depression of the switch S608 will cause the output of gate G654 to go low. This is passed thru gate N661 and amplifier L661, thereby causing the FRS fast reverse search line to go to ground. In addition, thru amplifier L659 and gate G630 the flops F662 and F663 are cycled, thereby causing a input buffer register clear and output buffer register clear pulse to be generated. This is basically the same mode of operation as the fast forward mode described above.

Forward One Record

Since the buffer memory stores two records of data, it is only necessary in the forward one record mode of operation to replace the date that is contained in the output buffer. The forward one record switch S614 contains an RC network on one side and a pullup resistor on the other side. Depression of the switch will momentarily cause the input to inverter I650 to go to ground for a period determined by the charge time of a capacitor and a 1K pullup resistor. This in turn generates a positive going pulse at the output of inverter I650. This pulse is used to set flop F662 and in turn flop F663. In this mode of operation it will be noted that gate N663 is not fully enabled because the output of amplifier L659 remains at ground. Flop F663 will enable gate N162 which will pass a 2KC clock pulse thru amplifier L662. This signal clears the output buffer of the buffer memory.

Rewind

The rewind cycle is initiated by depression of switch S606 which will cause the output of gate G656 to go low and in turn set flop F661. Flop F661 being set will cause the output of amplifier L661 to go low, thereby transmitting a FRS signal to the tape recorder. When flop F661 is set, a signal is set generated thru amplifier L659 and gate G650 that sets flop F662 and in turn flop F663. The cycling of the latter two flops will cause pulses to be transmitted to input buffer register clear and output buffer register clear. The end of tape alarm clear gate N664 is enabled by the set side of flop F661. In addition, the input to flop F664 is enabled. Therefore, a flop F664 will be set and in turn flop F667 will be set. The set side of flop F667 is fed back to the terminate logic at the input to gate G630. The tape direction control logic will be reset upon receipt of an end of tape alarm pulse.

Ready Logic

When ready switch 1 or ready switch 2 is depressed, the switch action is stored in either or both flops F633 and F634, which in turn are gated through an exclusive off circuit and emerge as levels from amplifiers L634 or L635. The line select levels from these line drivers will be used to select and gate the proper tape transport mechanism. The first ready flop that is set will have online priority. The other flop will store the ready request for its appropriate recorder until the online ready flop is reset. Whenever a ready line from amplifiers L634 or L635 goes high, a signal is gated thru gate G633 which sets flop F635. This in turn generates a series of pulses thru flops F636 and F637 which eventually will reset the chain. The set side of flop F637 when gated thru amplifiers L638 or L639 generates a tape input load signal to the appropriate recorder. The tape input load signal will command the appropriate recorder to advance its tape to its load point after which the recorder will stop. Another pulse which is transmitted thru gate N637 and amplifiers L662, L663 and L664 is sent from the output terminals of the buffer memory 2 to the input buffer register clear, output buffer register clear and system clear inputs of the buffer memory and recorder. The read mode cycle flag flop F632 is also set to indicate that a ready cycle mode has been requested. In addition, the ready level is passed thru either amplifier L636 or L637 and appears as a source select signal to the tape recorder. The ready levels are also used to gate the appropriate end-of-tape input alarm pulses and read mode control logic and in conjunction with the output of the tape read control flop F610 a busy light B602 or B603 will operate.

Read Mode Control Logic

Whenever the one record read mode switch S602 is pressed, the one record storage flop F623 is set.

Whenever the automode pushbutton S600 is pressed, the contact noise is debounced by delaying the output rise of the delay Z624 for a period longer than the bounce noise. When the output of delay Z624 goes high flop F625 will be set. The output of flop F625 is gated with a 2KC clock pulse and sets flop F622. The false side of flop F622 is fed back to the input of flop F625 so as to steer and command the next positive transition from delay Z624 to reset flop F625. Flop F622 stores the automode command and allows for synchronous turnoff of the automode request. Both the automode request and the 1 record mode request will cause the machine to output data for a full 80 character record.

Whenever a request is received by either flops F622 or F623 it is ANDed with the appropriate ready level thru gate G626. The output of flop F626 thru gate N621 and inverter I626 generates an online signal that is used to gate the appropriate tape direction control logic. The output of gate N620 is used to partially enable the reset logic of the mode control. The output of gate G626 also enables an input to amplifier L620.

Whenever the output buffer memory is full and is ready to output, the OBRF level into gate G624 will be at ground. Also, whenever the buffer memory is not placing a character on line, the buffer memory busy level into gate G624 will be at ground. When the tape has been properly selected and a read mode cycle is requested, the read mode cycle level into gate G624 will be at ground. When the translator is ready for data, the TRF level from the translator into gate G624 will be at ground. Since all inputs to gate G624 are low its output will go high, thereby allowing a 2KC clock to set flop F626 which in turn will set flop F627. This is a delay which allows settling of the OBRF, BMB and TRF levels prior to signaling that data is ready. Once flop F627 is set amplifier L620 is gated on and its output goes low. The output of inverter I628 enables the end-of-file detector D620 and if an end-of-file code is not present, the output of amplifier L621 will go low which in turn signals the translator that the output data from the buffer is ready. The translator now interprets the low ODLB signal as a command to take the data off line. After the translator has processed the data and is ready for new data, it raises the TRF line high to acknowledge that it is ready for new data. The TRF going high will reset flops F626 and F627 which in turn will cause the output of amplifier L620 to go high. The buffer request level going high is interpreted by the buffer request level going high is interpreted by the buffer as a request to bring the next character on line and the buffer responds by raising the buffer memory busy flag to indicate that it is cycling out the next data. In addition, the output of amplifier L621 has gone high, thereby turning off the ready command to the translator. This cycle continues over and over as long as the universal translator is in the automatic mode and data is in the buffer memory. When the translator is taken out of automatic mode and after transmitting the 80th character, the output buffer ready flag line from the buffer will rise to signal that the 80th character was transmitted. This signal is sent by gate N627 and is passed thru inverter I627 and gate G621 to reset the read mode control logic.

TAPE READ CONTROL LOGIC

After a recorder is placed in the ready mode on line, this logic operates automatically. The inputs to gate G610 sense that the tape direction control is not inoperation, that the tape ready level is at ground indicating that the tape recorder is ready, and the buffer write request from the buffer memory is at ground indicating that the input buffer is empty. These three signals gated thru gate G610 and ANDed with the 2KC clock will set flop F610 which in turn will cause the output of amplifier L610 to go to ground, thereby transmitting an input start command to the tape recorder. This command turns on the appropriate tape recorder and causes it to read data into the input buffer. When the input buffer receives its 80th character the buffer write request line is raised high. This causes the output of gate G610 to go to ground thereby disabling the input to flop F610. In addition, an input to gate G611 is enabled and this in conjunction with a 2KC clock pulse resets flop F610 which in turn will raise the output of amplifier L610 to a high state.

When flop F610 is cycling, its set side is fed to the busy light logic and in conjunction with the appropriate ready level will light a busy light for the duration of time that the tape recorder is in its read mode.

TERMINATE LOGIC

When an end-of-tape condition occurs, its signal is gated with the appropriate ready level thru gate G631 and inverter I631 and partially enables inputs to gate G630. Since the tape recorder is always two records ahead of the data going to the translator, it is necessary to wait until the buffer is empty before acting on the end of tape alarm. The necessary buffer information is gated thru gate G632 which in turn fully enables the end-of-tape alarm. The necessary buffer information is gated thru gate G632 which in turn fully enables the end-of-tape inputs to gate G630. Another input to gate G630 comes from flop F667 which was set during the rewind cycle. The rewind cycle request is gated thru gate G630 in conjunction with end-of-tape alarm to end the rewind cycle when the tape is wound back onto its leader. The final set of enabling inputs to gate G630 come from the end-of-file detector. Whenever the inputs to gate G630 are properly enabled, the output goes low thereby setting flop F630. This in turn enables the inputs to flop F631 in such a way that the next 2KC clock pulse will set flop F631. The following 2KC clock pulse will be passed thru gate N631 and will start to reset flops F630 and F631. In addition, the output of gate N631 is gated thru gate N632 and inverter I634 to reset flops F664 and F667, and F661. When flop F631 is reset, the read mode cycle flag F632 will be reset.

The action of flop F630 being set and then being reset is applied to the ready storage flags F633 and F634 and will reset the flag that is currently on line.

Figure 4:
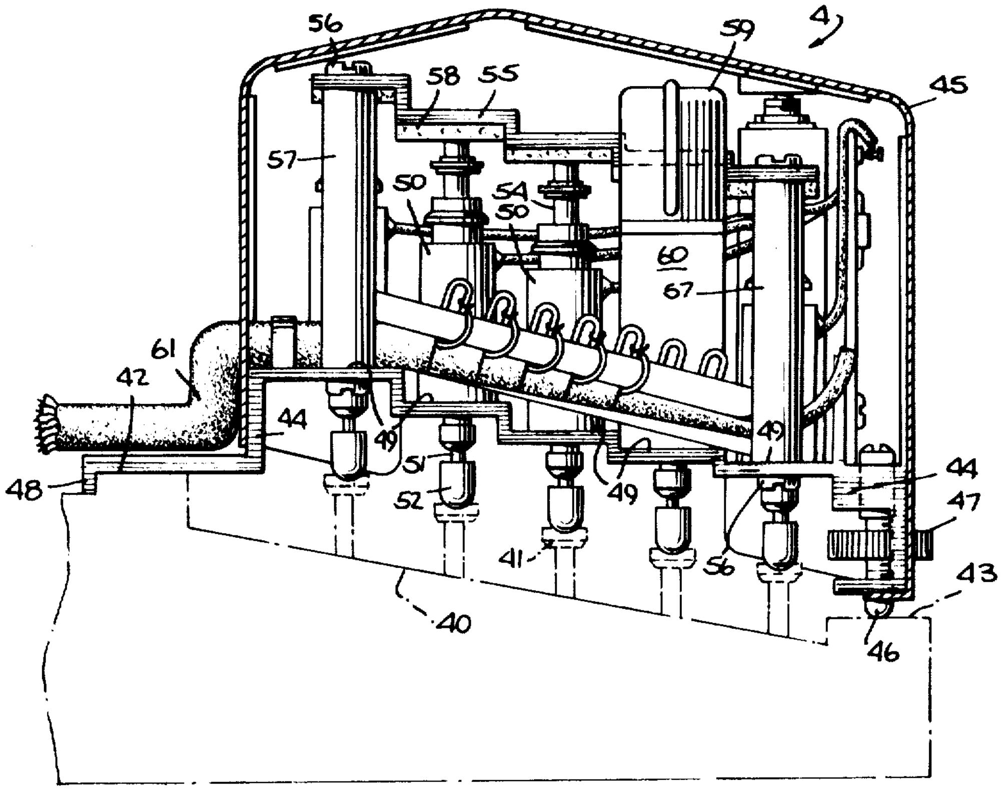
FIG. 4 is a side elevational view partially in section illustrating a preferred embodiment of the solenoid actuated printer.

FIGS. 4 and 5 illustrate a preferred embodiment of the printing solenoid attachment 4. This is a piece of auxiliary equipment which is removably positioned above the keyboard of a standard typewriter and which operate the typewriter keys for typing out the encoded data. A typical conventional typewriter cross section is illustrated at 40 including rows of keys 41 and upper and lower frame members 42 and 43.

The printing solenoid attachment 4 includes a base 44 and a detachable hollow cover 45. The base 44 includes adjustable screw supports 46 for engaging the typewriter surface 43 and including adjusting wheels 47. The supports 46 are adjusted by the use of the wheel 47 to place the solenoid printer 4 in its proper position with respect to the typewriter 40 and in particular, with respect to the typewriter keys 41. The rear portion of the base 44 includes a coupling flange or hook portion 48 arranged for engagement with appropriate complementary portions of the upper portion 42 of the typewriter frame.

As best illustrated in FIG. 4, a preferred and particularly effective shape for the base 44 provides a series of short steps 49 upon which the various solenoids 50 are mounted. This stepped arrangement of the base 44 permits a substantial number of the key actuating solenoids 50 to be identical and to operate with identical plunger 51 movements. The solenoids 50 are seen to include rounded key engaging tips 52 preferably formed of a plastic or a rubberlike material. These may be screwed or otherwise coupled to the solenoid plungers 51. In the preferred arrangement, the solenoid plungers 51 extend through their coil portions 53 so that they have upwardly directed control portions 54. An upper plate 55 is attached to the base 44 using connecting bolts 56 and spacers 57. This portion has resilient damping members 58 attached to its lower surface and spaced with respect to the solenoid plungers 51 to engage the plungers and to dampen or yieldably contain the return motion of the plungers 51 at the completion of a printing stroke. This plate also is preferably step-shaped in cross section similar to the shape of the base so that the upper portions 54 of the solenoid plungers 51 may also all be identical and so that identical plunger control or dampening actions are obtained for all solenoids 50 and all keys 41. This combination of identical solenoids 50 and stepped base 44 and upper plate 55 facilitates a uniform printing control or "feel" for the printing solenoids 50 and permits simultaneous adjustment of printing action for all the solenoids 50 by manipulation of the control wheels 47 and by other adjustments with respect to positioning the solenoid printer 4 on the typewriter keyboard. For certain keys, such as the typewriter shift keys or others where a stronger manipulation force may be required, larger solenoids may be positioned at the appropriate place and a suitable damping means obtained by an auxiliary upper plunger pad such as the pad 59 associated with the larger solenoid 60. Lead wires for the several solenoids are conveniently fed into the solenoid printer 4 in a flexible cable 61 which is divided and coupled to various solenoids in the space between the base 44 and the cover 45.

It will be seen that a novel data translation and printing system has been provided for obtaining typewritten copy of previously or simultaneously encoded data. The system is useful for translating the encoded data from magnetic type recordings or from other data storage devices and in particular it is useful for providing a maximum number of printed-out characters arranged in a predetermined format from a minimum number of encoded characters.

A typical example of the advantages of the systems occurs in its use with the widely employed "80 character" data storage pattern as now used with the common business system punch cards. These cards are used to store a succession of messages which must periodically read out or printed out. Similar 80 character (or shorter) messages are advantageously stored on tape so that a relatively large number of messages may be stored in a compact and convenient storage medium which may be used interchangeably with the cards. In either case, and in particular with the tape, the system of the present invention will provide a typewritten printout of the stored data with the messages being printed one after the other on a hard copy readout with a predetermined styling or format being used with the typewritten messages. The system of the present invention, as described above, includes a variety of novel means for arranging the spacing and other typewriter functions independently of encoded characters so that full advantage can be taken of a particular storage capability, and so that all stored characters may be employed for information readout while the format control is otherwise automatically accomplished.

In addition, the novel printing system of the present invention provides a particularly compact and simple system for such a translating device and adapts it for use with conventional unaltered typewriters. This permits the typewritten data output to be incorporated directly into other typewritten material and also permits the writing mechanism itself to be a relatively inexpensive typewriter which is readily serviced or replaced, where necessary, by regular typewriter maintenance personnel.

The printer system, in accordance with the present invention, is also adapted for controlling the printing speed at the maximum reliable speed of a particular typewriter so that full advantage is taken of the typewriter speed capabilities while at the same time mechanical typewriting errors caused by over feeding the typewriter are eliminated.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention I claim:

1. An improved data translation and printing system comprising the combination of a data source, a buffer memory system coupled to the output of said data source for receiving and temporarily storing data from said source, a data-translation means coupled to said buffer means comprising a readout memory for translating said data into solenoid control signals, a plurality of solenoids including printing plungers selectively coupled to said translating means for being selectively activated by the output of the translating means, a typewriter having a standard keyboard positioned adjacent to said printing solenoids whereby the solenoids selectively manipulate the typewriter keys, said read-only memory including a solenoid operation speed of transmission control for operating the solenoid plungers for a period corresponding to the operating characteristics of the related typewriter key, and said read-only memory further including an interval cycle control for spacing the input to the printing solenoids whereby the interval between solenoid operations is adjusted in accordance to the functioning of the typewriter keys being activated.

2. A data translation and printing system as claimed in claim 1 in which said printer comprises a typewriter having a tabulator, and said read-only memory further includes means for adjustably presetting the operation of the tabulator.

3. A data translation and printing system as claimed in claim 1 in which said printer comprises a typewriter including a carriage return key, a back space and a line indexing key, and said read-only memory further includes translating circuits for activating corresponding carriage return, back space and line-indexing solenoids in response to coded data signals.

4. A data translation and printing system as claimed in claim 1 in which said buffer memory means comprises a circulating memory.

5. A data translation and printing system as claimed in claim 1 in which said data source comprises a magnetic tape mounted on spaced reels for operation in both directions between said reels.

6. A data translation and printing system as claimed in claim 1 which further comprises means coupled to said buffer memory and said tape recorder for controlling the direction of tape movement and for terminating tape movement at the completion of a readout of a predetermined amount of data, and means for indicating the completion of the transfer of the predetermined amount of data to the buffer memory and the translation means.

7. The data translation and printing system as claimed in claim 1 in which said automatic tabulator means comprises a matrix program board with the matrix lines adapted for being interconnected by diode pins, and one or more diode connecting pins for being adjustably positioned at the matrix-connecting points.

8. The data translation and printing system as claimed in clam 1 which further comprises an automatic carriage return, means for activating said carriage return comprising character counting means for detecting the readout from the encoded data of a character having a predetermined position in the group of encoded characters.

9. The data translation and printing system as claimed in claim 1 which further comprises control means coupled to said data source and to said buffer memory for detecting the end of a predetermined amount of encoded data and for interrupting the transfer of data to the buffer memory.